United States Patent

[11] 3,583,385

| [72] | Inventor | Frank W. Beller |
| | | Aurora, Ill. |
| [21] | Appl. No. | 10,509 |
| [22] | Filed | Feb. 11, 1970 |
| [45] | Patented | June 8, 1971 |
| [73] | Assignee | Belson Manufacturing Co., Inc. |
| | | Aurora, Ill. |

[54] CAMPSTOVE WITH ADJUSTABLE AND PIVOTABLE GRILL
10 Claims, 3 Drawing Figs.

[52] U.S. Cl. ............................................. 126/25A
[51] Int. Cl. ............................................. A47j 37/00,
F24b 3/00
[50] Field of Search ............................................. 126/25, 25 A, 9, 30, 41

[56] References Cited
UNITED STATES PATENTS

| 3,027,887 | 4/1962 | Krohncke | 126/25 |
| 3,053,245 | 9/1962 | Beller | 126/25A |
| 3,070,084 | 12/1962 | Gier et al. | 126/25 |
| 3,304,929 | 2/1967 | Brunig | 126/25 |
| 3,364,913 | 1/1968 | Borglum | 126/25A |

*Primary Examiner*—Charles J. Myhre
*Attorney*—Darbo, Robertson and Vandenburgh

ABSTRACT: A cook stove has a firebox rotatably mounted on a post. In the sides of the firebox there are two vertical rows of notches which are engageable by the handle of the grill to support the grill at various levels in the firebox. One of these rows of notches is in an enclosed slot and the other is along an open edge. Thereby the grill cannot be removed from the firebox but can be pivoted out of the way.

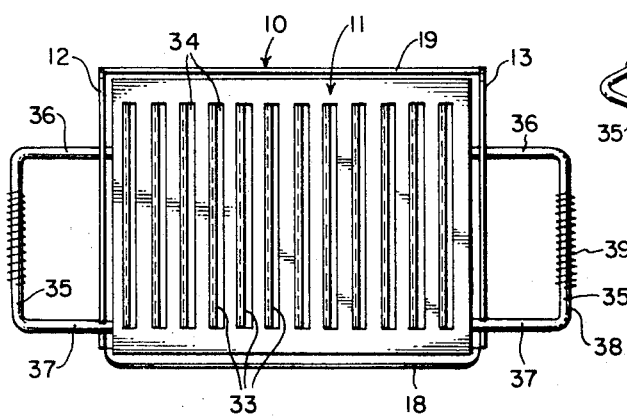
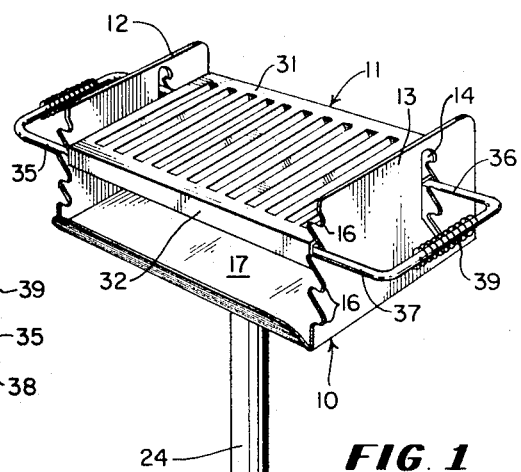
FIG. 3
FIG. 1
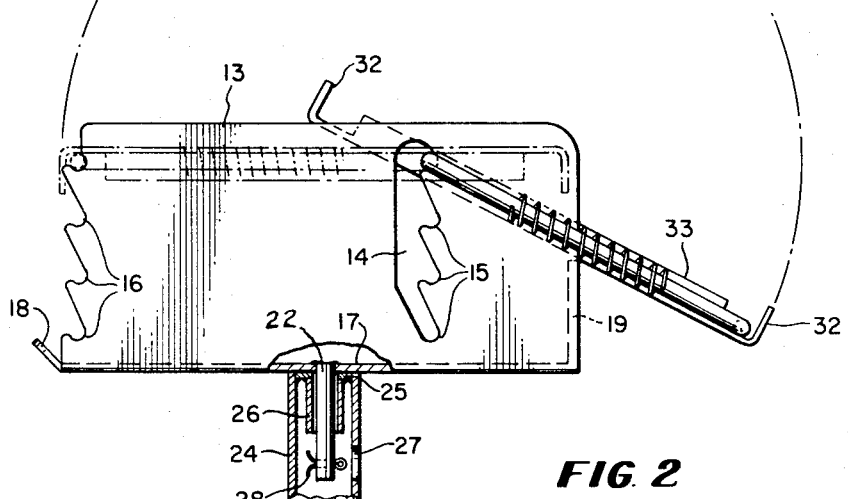
FIG. 2
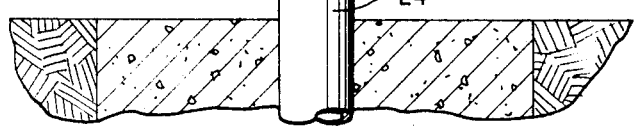
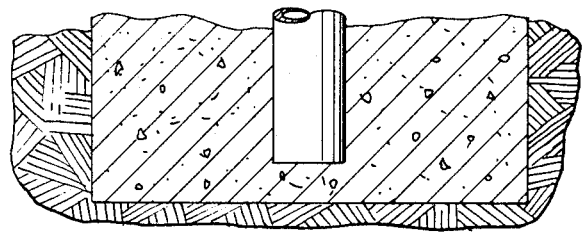
INVENTOR:
FRANK W. BELLER
By Darbo, Robertson
& Vandenburgh
ATTORNEYS

CAMPSTOVE WITH ADJUSTABLE AND PIVOTABLE GRILL

SUMMARY OF THE INVENTION

The present invention relates to an outdoor cookstove of a simple construction wherein the adjustable grill cannot be detached from the firebox but can be pivoted so as to provide a comparatively clear area above the firebox when the grill is not in use.

DESCRIPTION OF THE DRAWINGS

FIG. 1 is a perspective view of an embodiment of the invention;

FIG. 2 is a side elevation with portions broken away; and

FIG. 3 is a plan view.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The disclosed embodiment essentially is two pieces, namely, a firebox, generally 10, and a grill, generally 11. The firebox is formed of sheet metal and comprises two sides 12 and 13 which are mirror images of each other. Side 13 has an enclosed slot 14 with a row of notches 15 along one edge of the slot. The front edge of side 13 has a plurality of notches 16 therealong. Being along one end of the side, the notches 16 are not enclosed as are notches 15. The notches 15 and 16 are at the same respective elevations above the base 17 of the firebox. The firebox also includes a slanted front 18 and a back 19.

The base 17 of the firebox has a pin 22 welded thereto and extending downwardly therefrom to pivotally support the fire box on a stand, generally 23. Stand 23 consists of a 1½-inch pipe 24 (adapted to be set in concrete, as illustrated). At the upper end of pipe 24 a washer 25 is welded thereto and centrally within pipe 24 a short length of ½-inch pipe 26 is welded to the washer. Pin 22 extends through the washer and pipe 26. An access opening 27 is provided to permit a cotter key 28 to be inserted through pin 22 to lock the firebox to the support 23.

The grill 11 comprises a main body 31 fabricated from a flat plate of 3/16-inch thick sheet metal. The two longitudinal edges are bent down to form flanges 32. Extending transversely, a plurality of three-sided cuts have been made with the material within the three sides being bent down to form flanges 33. This leaves a plurality of openings 34 in the grill body. The grill also includes a pair of "U"shaped handles 35 having leg portions 36 and 37 and a connecting portion 38. A spring wire 39 is coiled about connecting portions 38 to serve as a handle. After the leg portions 36 have been inserted through slots 14, the handles 35 are welded to the body 31. Because slot 14 is fully enclosed and since portions 36 project through this closed slot, the grill 11 cannot thereafter be separated from firebox 10. However, the grill can be tipped or pivoted out of the way, as best illustrated in FIG. 2. This will permit, for example, easier access to the top of the firebox for the purpose of building a fire or for cleaning the firebox after it has been used. With the captive grills of the prior art, access to the top of the firebox is limited by the presence of the grill. This problem is greatly ameliorated by the construction of the present invention.

A further advantage of the present invention is that the principal parts are fabricated from die-formed metal sheets. This makes the construction relatively easy and rapid. There is a minimum of welding. All in all, the embodiments of the present invention can be manufactured quite inexpensively without losing the sturdiness of construction, as compared to prior art devices.

I claim:

1. In a cooking stove comprising a firebox with a pair of side members, a grill with a pair of side members, and means for adjustably supporting the grill at various heights above the firebox including two sets of vertical notches in each member of one pair, with portions of each member of the other pair being received in one notch respectively and movable to the other notches of the set, the improvement wherein:

one set of notches in each side is along an edge of an enclosed slot and the second set of notches on each side is unenclosed so that said portion may be moved away therefrom, said one set on one side being aligned with said one set on the other side so that the grill can be pivoted about said portions in said one set.

2. In a stove as set forth in claim 1, wherein each member of said one pair has an external edge and said second sets of notches extend along said external edges.

3. In a stove as set forth in claim 2, wherein said one pair comprises the firebox side members, and the grill side members are in the general form of "U"-shaped handles.

4. In a stove as set forth in claim 3, wherein said grill includes a body fabricated from sheet metal having the longitudinal sides bent down at right angles to form rigidifying flanges and, at intervals along the length thereof strips of the metal extending transversely have been cut out on three sides and bent down to add rigidity and to define openings in the grill, said "U"-shaped handles being welded to the underside of said plate.

5. In a stove as set forth in claim 1, wherein said one pair comprises the firebox side members, and the grill side members are in the general form of "U"-shaped handles.

6. In a stove as set forth in claim 5, wherein said grill includes a body fabricated from sheet metal having the longitudinal sides bent down at right angles to form rigidifying flanges and, at intervals along the length thereof strips of the metal extending transversely have been cut out on three sides and bent down to add rigidity and to define openings in the grill, said "U"-shaped handles being welded to the underside of said plate.

7. In a stove as set forth in claim 1, wherein said grill includes a body fabricated from sheet metal having the longitudinal sides bent down at right angles to form rigidifying flanges and, at intervals along the length thereof strips of the metal extending transversely have been cut out on three sides and bent down to add rigidity and to define openings in the grill, said grill side members being U-shaped handles welded to the underside of said plate.

8. In a stove as set forth in claim 1, including:

a cylindrical metal pin affixed to the bottom of said firebox and extending vertically downwardly therefrom; and a metal stand comprising a first length of pipe of a given internal diameter, a short length of pipe substantially smaller in diameter than said first pipe vertically positioned within said first pipe, and a connecting metal web between the two pipes at their upper ends, said short length being smaller in length than said pin and larger in internal diameter than the diameter of said pin;

said pin extending downwardly through said short pipe.

9. In an outdoor cooking apparatus comprising a metal firebox having a grill thereacross, the improvement comprising:

a cylindrical metal pin affixed to the bottom of said firebox and extending vertically downwardly therefrom; and a metal stand comprising a first length of pipe of a given internal diameter, a short length of pipe substantially smaller in diameter than said first pipe vertically positioned within said first pipe, and a connecting metal web between the two pipes at their upper ends, said short length being smaller in length than said pin and larger in internal diameter than the diameter of said pin;
said pin extending downwardly through said short pipe.

10. In an apparatus as set forth in claim 9, wherein said pin has a transverse opening therethrough below said short pipe, said first pipe having an opening in one side at the elevation of said transverse opening; and a cotter key through said transverse opening.